United States Patent Office 2,720,504
Patented Oct. 11, 1955

2,720,504

ORGANO-METALLIC ZIRCONIUM CATALYSTS FOR THE PREPARATION OF POLYESTERS

John R. Caldwell and John W. Wellman, Kingsport, Tenn., assignors to Eastman Kodak Company, Rochester, N. Y., a corporation of New Jersey No Drawing. Application October 3, 1952,
Serial No. 313,074

13 Claims. (Cl. 260—75)

This invention relates to a process for preparing polyesters which comprises condensing a diester of a dicarboxylic acid with a polyhydroxy compound in the presence of at least one of a group of novel catalytic condensing agents which are alkali metal and alkaline earth metal salts containing a complex zirconium hexalkoxide radical and which are defined hereinbelow. These novel catalytic condensing agents can be advantageously employed in the preparation of linear polyesters wherein the dicarboxylic acid is an aromatic compound which does not contain any ethylenic (olefinic) unsaturation and the polyhydroxy compound is a dihydroxy compound. In preparing such linear polyesters it is advantageous to conduct the condensation in an inert atmosphere at an elevated temperature which is increased during the course of the condensation up to a temperature of from about 225° to about 310° C., the condensation being conducted during the latter stages thereof at a very low subatmospheric pressure.

This application contains subject matter disclosed to some extent in a copending application, Serial No. 143,594, filed Feb. 10, 1950, by J. R. Caldwell, now U. S. Patent No. 2,614,120, dated October 14, 1952. This application also contains subject matter disclosed in other copending applications filed on even date herewith by J. R. Caldwell, Serial Nos. 313,061 through 313,071.

Various polyesters of dicarboxylic acids and polyhydroxy compounds are well known in the prior art and have been used, for example, in the manufacture of paints and varnishes. Moreover, prior art disclosures set forth various linear condensation polyesters derived from dihydroxy compounds and dibasic acids such as terephthalic acid which are capable of being drawn into fibers showing by characteristic X-ray patterns, orientation along the fiber axis. However, many of these linear polyesters possess a relatively low melting point and a fairly considerable solubility in various solvents whereby they are of restricted utility, especially in the textile field. These polyesters vary considerably in their characteristics, depending on the particular dicarboxylic acid and the particular polyhydroxy compound employed. Generally speaking, these polyesters have various physical characteristics which are not as satisfactory as could be desired.

The preparation of polyesters is well known in the prior art and involves the reaction of a dibasic dicarboxylic acid with a dihydric or polyhydric alcohol. It is advantageous to employ esters of the dicarboxylic acid whereby ester interchange takes place with the glycol or polyhydric alcohol to form a polyester and an alcohol. When using the ester interchange method, the time required to form the polyesters is generally considerably less than when the free dicarboxylic acid is employed. The long chain in the polyester is built up by a series of ester interchange reactions wherein the glycol displaces a relatively low-boiling alcohol component of the acid ester to form a glycol ester. During the last stages of the reaction, it is generally desirable to heat the condensing reaction mixture to a temperature of about 225°–275° C. or higher in order to maintain the fluid state. For this reason, the properties of the catalytic condensing agent is very important.

A desirable catalytic condensing agent must be active enough to promote ester interchange at a temperature below the boiling point of the glycol or other polyhydric alcohol. At the same time, the catalyst must be stable at temperatures of 225°–310° C. or even higher if necessary. Furthermore, the catalyst must not cause decomposition or degradation of the polyester at these high temperatures.

In accordance with this invention, it has been found that certain compounds are especially valuable for use as catalytic condensing agents in the preparation of high melting linear polyesters. They have the general formula structures set forth below:

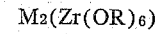

and

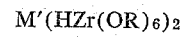

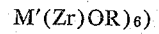

wherein M is an alkali metal, e. g. lithium, sodium, or potassium, M' is an alkaline earth metal such as Mg, Ca or Sr, and R is an alkyl radical containing from 1 to 6 carbon atoms; R can be derived from a lower aliphatic alcohol such as methyl, ethyl, propyl, n-butyl, isobutyl, n-amyl, etc.

These novel catalysts can be advantageously employed in processes for preparing polyesters, which processes are described below. These novel catalysts are effective only when substantially anhydrous conditions are employed and no free acid is present to a sufficiently significant extent to destroy the catalyst compound; thus, when free acids are employed the acids are first reacted with a hydroxy compound (preferably the polyhydroxy compound to be employed in the polyesterification process) before the novel catalyst of this invention is added.

The novel bimetallic alkoxide catalysts can be made as described by Meerwein, Ann. 455,227 (1927); 476,113 (1929), viz. zirconium tetrachloride is treated with sodium alkoxide to give Zr(OR)4 in excess alcohol; the alkali metal or alkaline earth metal is then dissolved in the alcohol solution. Alternatively, a solution of zirconium alkoxide can be mixed with a solution of the alkali metal or alkaline earth metal alkoxide in the calculated proportions.

As shown by Meerwein, these catalyst are not merely mixtures of the two metallic alkoxides. They are definite compounds having a salt-like structure. The zirconium alkoxide coordinates 2 mols of alcohol to form an acid as follows:

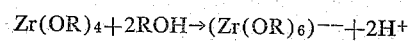

This acid can then be reacted with a suitable alkali metal, alkaline earth metal or an alkoxide thereof, e. g. sodium alkoxide, to give an acid salt having the structure:

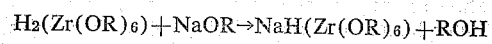

The acid salt can react with another mol of alkali metal alkoxide to form a neutral salt according to the equation:

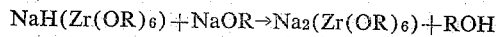

These salts are much more effective as catalysts than either of the metal alkoxides used alone. Although the neutral salt, containing 2 atoms of alkali metal, is an efficient catalyst, the acid salt is usually to be preferred because it tends to be more stable under the conditions of the reaction.

The novel catalysts of this invention give a very rapid reaction rate at all stages of the polyesterification process, including the final step where the molecular weight is built up. They are particularly valuable for the preparation of high melting polyesters from 1,6 hexanediol and 1,5-pentanediol. It is well known that these glycols have a tendency to decompose at temperatures above 250–260° C. and hence are difficult to use. With the novel catalysts described above polyester reactions employing these glycols can be carried out at temperatures up to 300° C. or even higher without excessive decomposition.

The novel catalysts can, in general, be employed for the preparation of substantially all polyesters involving an ester interchange reaction between a dicarboxylic acid ester and a glycol or glycol ester. The catalysts are especially valuable for the preparation of polyesters that melt above about 240° C., as for example, polyethylene terephthalate. The process of the invention is applicable to all of the polyesters described herein.

By employing the novel catalysts of this invention, the reaction rate of the polyesterification process can be increased by a factor which is generally from about 2 to 5 times the reaction rate obtainable when catalysts known in the prior art are employed. Moreover, the novel catalysts of this invention have the valuable characteristic of minimizing side reactions which have the tendency of causing considerable degradation of the polyester products at the relatively high temperatures employed in preparing highly polymeric polyesters. Furthermore, by employing these novel catalysts to increase the rate of condensation, the time available for possible decomposition of the high molecular weight polyester molecules being formed at high temperatures is aprpeciably reduced. Thus, by increasing the reaction rate, the time required to make a polyester is reduced which is quite important because at 250°–300° C. the degree of color formation and extent of deleterious side reactions is proportional to the time of heating.

The polyesters produced when employing these novel catalysts have greatly improved properties as compared to products obtained employing catalysts known in the prior art. The molecular weight is considerably higher whereby highly polymeric polyesters are obtained. The color of the polyesters obtained is excellent; the products can therefore be employed for purposes calling for white or colorless materials. The physical properties of the polyesters obtained are also superior. At high temperatures there is a great improvement in the inherent viscosities of linear polyesters which are suitable for melt spinning or extrusion whereby fibers, films, etc. can be produced having properties superior to those obtainable with known catalysts.

The herein described novel catalysts are especially valuable for the preparation of polyesters employing diesters of p,p'-sulfonyl dibenzoic acid as described in copending applications filed on even date herewith by J. R. Caldwell, Serial Nos. 313,061–313,068. Many of these polyesters are very high melting and the reaction must often be carried out at a temperature of 280°–300° C. or higher. It has been found that relatively few catalysts are effective at this temperature other than those described in this application.

It is an object of this invention to provide new and improved catalytic condensing agents for promoting the formation of improved polyesters in processes involving ester interchange and alcoholysis. A further object of this invention is to provide a new and improved method for the preparation of polyesters wherein such new and improved catalysts are employed. Other objects will become apparent elsewhere in this specification.

A broad aspect of this invention relates to a process for preparing a polyester which comprises condensing under substantially anhydrous conditions at an elevated temperature in an inert atmosphere a diester of a dicarboxylic acid with from about 1 to about 10 equivalent proportions of a polyhydroxy compound, in the presence of a catalytic condensing agent selected from the group consisting of those compounds having the formulas:

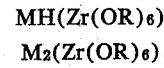

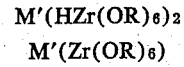

and

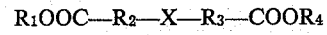

wherein M represents an alkali metal, M' represents an alkaline earth metal selected from the group consisting of magnesium, calcium and strontium, and R represents an alkyl group containing from 1 to 6 carbon atoms.

More specifically, this invention relates to a process for preparing a polyester comprising (A) condensing under substantially anhydrous conditions an aromatic dicarboxylic acid diester having the formula:

$$R_1OOC—R_2—X—R_3—COOR_4$$

wherein $R_1$ and $R_4$ each represents a substituent selected from the group consisting of an alkyl radical containing from 1 to 10 carbon atoms and an omega-hydroxyalkyl radical containing from 2 to 12 carbon atoms, $R_2$ and $R_3$ each represents $(CH_2)_{n-1}$ wherein $n$ is a positive integer of from 1 to 5 inclusive and X represents a divalent aromatic radical selected from the group having the following formulas:

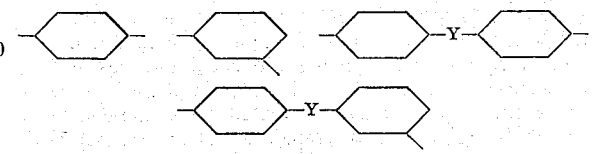

and

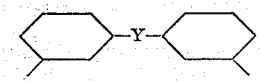

wherein Y represents a divalent radical selected from the group consisting of

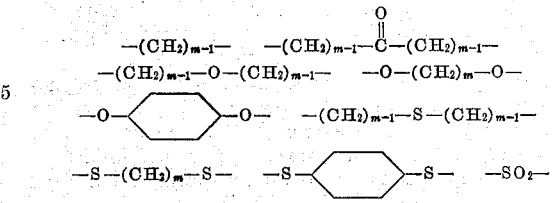

and

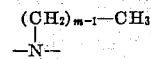

wherein $m$ is a positive integer of from 1 to 5 inclusive, (B) with an alpha,omega-dioxy compound selected from the group consisting of those compounds having the following formulas:

and

wherein $p$ represents a positive integer of from 2 to 12 inclusive, $R_5$ and $R_6$ each represents a substituent selected from the group consisting of a hydrogen atom and acyl radical containing from 2 to 4 carbon atoms, $R_7$ represents an alkylene radical containing from 2 to 4 carbon atoms and $q$ represents a positive integer of from 1 to 10 inclusive, the alpha,omega-dioxy compound being employed in such a proportion that there is at least an equivalent amount of alpha and omega oxy substituents in proportion to the carbalkoxy substituents in the overall combination of the aromatic diesters and the alpha,omega-dioxy compounds, (C) in the presence of a condensing agent selected from the group consisting of the novel catalysts set forth above, (D) at an elevated temperature which is increased gradually during the course of the condensation up to a temperature of from about 225° to about 310° C., (E) the condensation being conducted in an inert atmosphere, (F) and conducting the condensation at a very low pressure of the inert atmosphere during the latter part of the condensation.

Advantageously, the condensing agent is employed in an amount of from about 0.005% to about 0.2% based on the weight of the aromatic dicarboxylic acid diester. Higher and lower proportions can also be employed.

Advantageously, the alpha,omega-dioxy compound is employed in such a proportion that there are from about 1.2 to about 3 alpha and omega oxy substituents in proportion to the carbalkoxy substituents in the overall combination of the aromatic diesters and the alpha,omega-dioxy compounds. Higher (e. g. 10) and lower (e. g. 1) proportions can also be employed.

Since the alpha, omega-dioxy compounds which can be employed in accordance with this invention are most advantageously alpha, omega-dihydroxy compounds and in order to facilitate the phraseology which is employed in this specification, such compounds will hereinafter be referred to as polyhydroxy or dihydroxy compounds although it is to be understood that the alpha, omega-dioxy compounds of the type described above are intended to be covered by the term dihydroxy compounds or the term polyhydroxy compounds as such terms are employed herein.

Advantageously, the temperature employed during the earlier part of the condensation is from about 150° to about 220° C. Higher and lower temperatures can also be employed.

Advantageously, the low pressure defined under (F) is less than about 15 mm. of Hg pressure (preferably less than 5 mm.). However, somewhat higher pressures can also be employed.

Most advantageously, the aromatic dicarboxylic acid diester is a diester of p,p'-sulfonyl dibenzoic acid or terephthalic acid and the polyhydroxy compound is a polymethylene glycol.

This invention also includes processes as described above whereby polyesters can be prepared by replacing a part of the described aromatic dibasic acid diester with an ester of a replacement acid which can be an aliphatic dibasic acid, e. g. carbonic acid, oxalic acid, succinic acid, adipic acid, sebacic acid, α,α-dimethylglutaric acid, dimethylamalonic acid, diglycollic acid, β-oxydipropionic acid, γ-oxydibutyric acid, maleic acid, fumaric acid, itaconic acid, etc. Similarly, other esterified acidic modifiers can also be incorporated in conjunction with or in lieu of these replacement acid esters, e. g. linoleic acid, linolenic acid, fatty acids of linseed oil, soybean oil, cottonseed oil, tung oil, etc. The process described above for the general practice of this invention need not be appreciably modified when such partial replacement acid esters are employed in conjunction with the aromatic dibasic acid esters except when they are unsaturated and tend to form insoluble and infusible products due to cross-linkage effects, in which event the process described hereinabove is advantageously terminated at an intermediate temperature of about 250° C. before the pressure is reduced whereby products are obtained which can be called soluble intermediate polyesters which are useful in preparing protective coatings. The various polyesters containing replacement acid esters as described in this paragraph can be prepared according to procedures similar to those described in copending applications filed on even date herewith by J. R. Caldwell, Serial Nos. 313,062 through 313,066.

Polyesters can also be prepared in accordance with this invention by replacing a part of the described dihydroxy compound with what can be called a polyhydroxy compound which contains 3 or more hydroxy radicals, e. g. glycerol, sorbitol, pentaerythritol, dipentaerythritol, β-methylglycerol, 2-methyl-2-hydroxymethyl-1,3-propanediol, 1,2,4-trihydroxybutane, etc. In the preparation of polyesters employing these polyhydroxy compounds, the reaction mixture is not generally heated to the high temperatures under reduced pressure as described hereinabove since the product would become insoluble and infusible due to cross-linking of the molecules; hence, the process is halted at about 250° C. or less prior to the reduction in pressure of the inert atmosphere. Various solutions can then be prepared from these soluble polyester products which can then be cast into films or otherwise used in protective coating compositions. In preparing such soluble polyesters it is generally advantageous to employ an unsaturated aliphatic dibasic acid diester in lieu of a part of the described aromatic dibasic acid diesters, e. g. maleic, fumaric and itaconic diesters. The various polyesters containing replacement polyhydroxy compounds as described in this paragraph can be prepared according to procedures similar to those described in a copending application filed on even date herewith by J. R. Caldwell, Serial No. 313,069.

The dihydroxy or polyhydroxy compounds defined above may not actually contain any free hydroxy radicals since they may be in esterified form as indicated by the formulas of the dihydroxy compounds set forth above. However, these hydroxy or substituted hydroxy radicals are referred to generally as hydroxy radicals or substituents. Each diester is considered as containing two carbalkoxy radicals as that term is employed in the definition of the process as described above since $R_1$ and $R_4$ may be alkyl radicals, or omega-hydroxyalkyl radicals. Even when the process is preceded by the preliminary step described below employing free acids, the term carbalkoxy radicals in the description of the process is intended to encompass such free carboxy radicals.

Furthermore, this invention covers processes as defined above wherein the aromatic dicarboxylic acid diester is formed by a preliminary step comprising condensing an aromatic dicarboxylic acid having the formula:

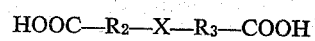

$$HOOC-R_2-X-R_3-COOH$$

(wherein $R_2$, $R_3$ and X are defined under (A) in the above-described process), with a polyhydroxy compound which is defined above under (B) and is employed in the proportions set forth under (B), at an elevated temperature, after which preliminary step the novel catalytic condensing agent which is defined under (C) is added and the condensation is completed as defined under (D), (E) and (F). Advantageously, the elevated temperature employed during the preliminary step is substantially that at which reflux conditions subsist; however, higher and lower temperatures can also be used. Advantageously, as indicated hereinbefore, the polyhydroxy compound is employed in such a proportion that there are from about 1.2 to about 3 hydroxy substituents in proportion to the acid substituents in the overall combination of the aromatic diester and the polyhydroxy compound.

In preparing polyesters, especially linear highly polymeric polyesters, it is important to exclude oxygen and moisture at all stages of the condensation, particularly during the latter stages thereof. An inert atmosphere is employed to exclude oxygen; such atmospheres include, hydrogen, nitrogen, helium, etc. The reacting materials employed in the condensation are advantageously substantially anhydrous; however, if water is initially present or is formed during the course of the condensation, it can be substantially completely removed prior to the final stages of the condensation by operating in accordance with the specified process or otherwise.

Examples of aromatic dicarboxylic acid diesters which can be employed as defined above under (A) include the β-hydroxyethyl diester of p,p'-sulfonyl dibenzoic acid, p,p'-sulfonyl dibenzoic acid dibutyl ester, m,p'-sulfonyl dibenzoic acid dipropyl ester, m,m'-sulfonyl dibenzoic acid dihexyl ester, methyl terephthalate, hexyl terephthalate, isopropyl terephthalate, as well as various esters having the following formulas:

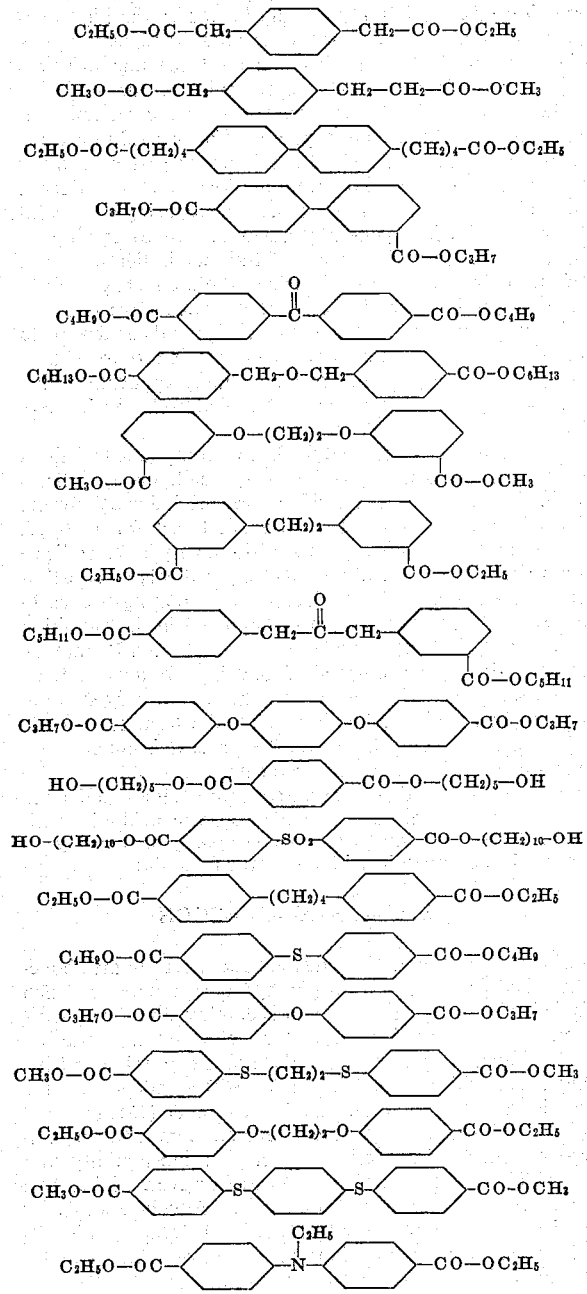

et cetera.

The dihydroxy compounds which can be employed to form highly polymeric linear polyesters are straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1,6-hexylene glycol, 1,10-decamethylene glycol, 1,12-dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifiers. Examples of ether glycols include diethylene glycol, triethylene glycol, tetraethylene glycol, bis (4-hydroxybutyl) ether, bis (3-hydroxypropyl) ether, etc.

Valuable fibers can be advantageously prepared employing the higher melting polyesters which can be produced according to the procedures described herein. Preferably no aliphatic ether glycol is employed when fibers are to be prepared. Furthermore, the aromatic acid diesters should ordinarily contain only $p, p'$ linkages when highly polymeric linear polyesters are desired. However, on the other hand, valuable polyesters can be prepared employing aliphatic ether glycols without any polymethylene glycol although the product obtained will not be suitable for forming useful fibers. The same applies to the employment of aromatic diesters containing linkages in other than the para positions.

The catalytic condensing agents which can be employed have been described above. From about 0.005% to about 0.2% of such catalysts based on the weight of the diesters being condensed can be employed. Higher or lower percentages can also be employed. Generally, from about 0.01% to about 0.06% of the catalytic condensing agent can be advantageously employed based on the weight of the various diesters being condensed.

The temperature at which polyesterification can be conducted is dependent upon the specific reactants involved in any given reaction. In general, the reaction mixture can be heated with agitation at from about 150° to about 220° C. for from approximately one to three hours in an inert atmosphere (e. g. nitrogen or hydrogen); the mixture can then be heated with agitation at from about 225°–240° to about 280°–310° C. in the same atmosphere for approximately 1 to 2 hours. Finally, the pressure can be greatly reduced to form a vacuum (less than about 15 mm. of Hg pressure but preferably on the order of less than 5 mm. of Hg pressure) while the temperature is maintained in the same range (225°–310° C.); these conditions are advantageously maintained for approximately 1 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, the stability of the polyester being produced, and the use for which the product is intended.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

In the examples given below, the hot bar sticking temperature is referred to in several instances. The hot bar sticking test can be briefly described as follows: A polyester fiber is placed on the flat surface of a heated bar and a weight of 100 grams is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given herein.

This invention can be further illustrated by the following examples; in addition to these examples it is apparent that other variations and modifications thereof can be adapted to obtain similar results:

*Example 1.*—NaH(Zr(OC₄H₉)₆) *as the catalyst*

Eighty-four grams (0.2 mol) of p,p'-sulfonyldibenzoic acid butyl ester and 36 g. (0.3 mol) of 1,6-hexanediol were placed in a vessel equipped with a variable speed stirrer of the anchor type, a short distillation column, and a gas inlet tube for purified hydrogen. Two cc. of n-butyl alcohol containing 0.01 g. of NaH(Zr(OC₄H₉)₆) were added. The mixture was heated in a metal bath at 200–210° C. and stirred at 100–120 R. P. M. while pure hydrogen was passed over the surface. Butyl alcohol distilled rapidly and the ester interchange was practically complete in 30 minutes. The temperature was then raised to 270–280° C. in 15 minutes and heating continued for 10–15 minutes. Some of the excess glycol distilled off at this stage. The hydrogen gas was shut off, and a vacuum of about 1 mm. of Hg pressure applied. The melt rapidly increased in viscosity and in about 15 minutes it was necessary to reduce the stirrer speed to 40 R. P. M. As the viscosity increased, the stirrer speed was gradually reduced. After a total time of 30–40 minutes under vacuum, the melt had become too viscous to stir and the reaction was stopped. The melt obtained was clear and colorless. After cooling slowly, the product was hard and opaque, due to crystallinity. If the melt is suddenly cooled or quenched, it has a tendency to remain amorphous and transparent. On a hot stage, in polarized light, the crystalline material shows a melting point of 270–280° C. The inherent viscosity in 60% phenol-40% tetrachlorethane is 0.70–0.80. Fibers can be pulled from the melt and cold-drawn 500–600%. They stick on a hot bar at 230–240° C. The polyester also gives valuable sheets and films.

*Example 2.*—KH(Zr(OC$_2$H$_5$)$_6$) *as the catalyst*

One hundred grams p,p'-sulfonyldibenzoic acid ethyl ester and 40 g. 1,5-pentanediol were placed in a reaction vessel equipped with a stirrer, a short distillation column and an inlet tube for purified nitrogen. Five cc. of ethyl alcohol containing 0.4 g. of KH(Zr(OC$_2$H$_5$)$_6$) was added and the mixture heated at 180–200° C. with stirring. After 1 hour, the distillation of ethyl alcohol ceased, and the temperature was raised to 280–285° C. where it was held for 20 minutes. A vacuum of 0.5 to 1.0 mm. was applied for 1 hour, while the temperature was maintained at 280–285° C. A colorless product having an inherent viscosity of 0.80–0.90 in 60% phenol-40% tetrachlorethane solution was obtained. Fibers pulled from the melt and cold drawn 400–500% show a sticking temperature of 240–250° C. The product is also useful for films and sheets.

*Example 3.*—Mg(Zr(OC$_2$H$_5$)$_6$) *as the catalyst*

One gram mol of methyl sebacate, 4 gram mols of p,p'-sulfonyl-dibenzoic acid butyl ester, and 7 gram mols 1,6-hexanediol were placed in a vessel as described in Example 2. Five-hundredths percent Mg(Zr(OC$_2$H$_5$)$_6$) was added, based on the weight of the two esters. A heating schedule similar to that given in Example 2 was followed. The product obtained is very tough and rubbery. It has an inherent viscosity of 0.80 in a solvent of 60% phenol-40% tetrachlorethane. Fibers pulled from the melt show a rubbery elastic elongation of 30–40%. This product is also useful as a molding plastic.

*Example 4.*—Mg(HZr(OC$_4$H$_9$)$_6$)$_2$

One gram mol of methylisophthalate, 5 gram mols of p,p'-sulfonyl-dibenzoic acid ethyl ester, and 10 gram mols 1,5-pentanediol were placed in a vessel as described in Example 2. Six-hundredths percent Mg(HZr(OC$_4$H$_9$)$_6$)$_2$ was added, based on the weight of the two esters. A heating schedule similar to that given in Example 2 was followed. The product obtained is hard and crystalline. It is useful for injection molding.

*Example 5.*—Ca(HZr(OCH$_3$)$_6$)$_2$ *as the catalyst*

One hundred grams of methylterephthalate and 40 g. of ethylene glycol were placed in a vessel as described in Example 1. Three-hundredths percent Ca(HZr(OCH$_3$)$_6$)$_2$ was added, based on the weight of methylterephthalate. A heating schedule was followed as described in Example 1. A polyester having excellent color and an inherent viscosity of 0.80–0.90 was obtained.

*Example 6.*—Sr(HZr(OC$_3$H$_5$)$_6$)$_2$

The polyester described in Example 5 was prepared again by the same process employing the same apparatus; however, the catalyst was 0.03% of Sr(HZr(OC$_3$H$_5$)$_6$)$_2$ in lieu of the corresponding Ca salt employed in Example 5. The product obtained has the same properties of the polyester described in Example 5.

*Example 7.*—LiH(Zr(OC$_5$H$_{11}$)$_6$) *as the catalyst*

The polyester described in Example 2 was once again prepared employing the same apparatus and process except for the substitution of 0.4 gram of LiH(Zr(OC$_5$H$_{11}$)$_6$) as the catalyst. The polyester obtained had the same properties as that described under Example 2.

*Example 8.*—NaH(Zr(OC$_4$H$_9$)$_6$) *as the catalyst*

One gram mole of p,p'-dicarbethoxydiphenyl methane and 2.1 gram moles of ethylene glycol were condensed in apparatus as described in Example 1 according to the procedure set forth therein employing 2 cc. of the same catalyst solution. The product obtained was a highly polymeric linear polyester useful as a molding resin, for preparing films, sheets, etc.

*Example 9.*—NaH(Zr(OC$_4$H$_9$)$_6$) *as the catalyst*

One gram mole of p,p'-dicarbomethoxybenzophenone and 2.4 gram moles of trimethylene glycol were condensed in apparatus as described in Example 1 according to the procedure set forth therein employing 2 cc. of the same catalyst solution. The product obtained was a highly polymeric linear polyester useful as a molding resin, for preparing films, sheets, etc.

*Example 10.*—NaH(Zr(OC$_4$H$_9$)$_6$) *as the catalyst*

One gram mole of 1,2-bis(p-carbopropoxyphenyloxy) ethane and 2.5 gram moles of ethylene glycol were condensed in apparatus as described in Example 1 according to the procedure set forth therein employing 2 cc. of the same catalyst solution. The product obtained was a highly polymeric linear polyester useful as a molding resin, for preparing films, sheets, etc.

Polyesters similar to those described in the above examples can be prepared employing 1,4-bis(p-carbamyloxyphenoxy)benzene, bis (p-carbethoxyphenyl)sulfide and N,N - bis(p - carbohexoxyphenyl)methylamine, condensed with ethylene glycol, tetramethylene glycol and hexamethylene glycol.

In the various formulas given for the catalysts in the above examples, C$_4$H$_9$ and the formulas for other such alkyl radicals are intended to represent the straight chain alkyl radicals. However, branched chain radicals can also be employed.

*Example 11.*—K$_2$Zr(OC$_4$H$_9$)$_6$ *as the catalyst*

The polyester described in Example 1 was prepared again by the same process employing the same apparatus; however, the catalyst was 0.04% of K$_2$Zr(OC$_4$H$_9$)$_6$ in lieu of the NaHZr(OC$_4$H$_9$)$_6$ employed in Example 1. The product obtained has the same properties as the polyester described in Example 1.

*Example 12.*—CaZr(OCH$_3$)$_6$ *as the catalyst*

The polyester described in Example 5 was prepared again by the same process employing the same apparatus; however, the catalyst was 0.05% of CaZr(OCH$_3$)$_6$ in lieu of the corresponding acid salt employed in Example 5. The product obtained has the same properties as the polyester described in Example 5.

We claim:

1. A process for preparing a polyester comprising (A) condensing under substantially anhydrous conditions an aromatic dicarboxylic acid diester having the formula:

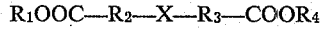

$$R_1OOC-R_2-X-R_3-COOR_4$$

wherein $R_1$ and $R_4$ each represents a substituent selected from the group consisting of an alkyl radical containing from 1 to 10 carbon atoms and an omega-hydroxyalkyl radical containing from 2 to 12 carbon atoms, $R_2$ and $R_3$ each represents (CH$_2$)$_{n-1}$ wherein $n$ is a positive integer of from 1 to 5 inclusive, and X represents a divalent aromatic radical selected from the group consisting of those having the following formulas:

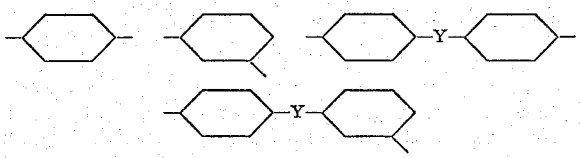

and

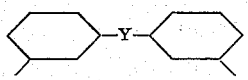

wherein Y represents a divalent radical selected from the group consisting of

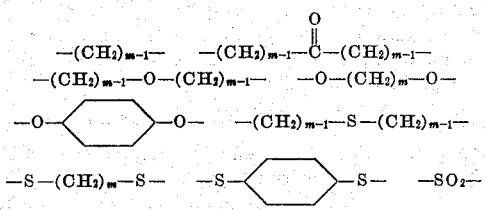

and

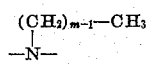

wherein $m$ is a positive integer of from 1 to 5 inclusive, (B) with an alpha, omega-dioxy compound comprising a compound selected from the group consisting of those compounds having the following formulas:

$$R_5-O-(CH_2)_p-O-R_6$$

and $$R_5O-(-R_7-O)_q-R_7-OR_6$$

wherein $p$ represents a positive integer of from 2 to 12 inclusive, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the alpha, omega-dioxy compound being employed in such a proportion that there is at least an equivalent amount of alpha and omega oxy substituents in proportion to the carbalkoxy substituents in the overall combination of the aromatic diester and the alpha, omega-dioxy compound, (C) in the presence of a catalytic condensing agent selected from the group consisting of those compounds having the following formulas:

$$MH(Zr(OR)_6)$$

$$M_2(Zr(OR)_6)$$

$$M'(HZr(OR)_6)_2$$

and $$M'(Zr(OR)_6)$$

wherein M represents an alkali metal, M' represents an alkaline earth metal selected from the group consisting of magnesium, calcium and strontium, and R represents an alkyl group containing from 1 to 6 carbon atoms, (D) at an elevated temperature which is increased gradually during the course of the condensation up to a temperature of from about 225° to about 310° C., (E) the condensation being conducted in an inert atmosphere, (F) and conducting the condensation at a very low pressure of the inert atmosphere during the latter part of the condensation.

2. A process as defined in claim 1 wherein the condensing agent is employed in an amount of from about 0.005% to about 0.2% based on the weight of the aromatic dicarboxylic acid diester.

3. A process as defined in claim 2 wherein the alpha,-omega-dioxy compound is employed in such a proportion that there are from about 1.2 to about 3 alpha and omega oxy substituents in proportion to the carbalkoxy substituents in the overall combination of the aromatic diester and the alpha, omega-dioxy compound.

4. A process as defined in claim 3 wherein the elevated temperature employed during the earlier part of the condensation is from about 150° C. to about 220° C.

5. A process as defined in claim 4 wherein the low pressure defined under (F) is less than 15mm of Hg pressure.

6. A process as defined in claim 5 wherein the low pressure defined under (F) is less than 5mm of Hg pressure.

7. A process as defined in claim 6 wherein the aromatic diester is derived from p,p'-sulfonyl dibenzoic acid and the condensing agent is $NaH(Zr(OC_4H_9)_6)$.

8. A process as defined in claim 6 wherein the aromatic diester is derived from p,p'-sulfonyl dibenzoic acid and the condensing agent is $KH(Zr(OC_2H_5)_6)$.

9. A process as defined in claim 6 wherein the aromatic diester is derived from p,p'-sulfonyl dibenzoic acid and the condensing agent is $Mg(Zr(OC_2H_5)_6)$.

10. A process as defined in claim 6 wherein the aromatic diester is derived from p,p'-sulfonyl dibenzoic acid and the condensing agent is $Mg(HZr(OC_4H_9)_6)_2$.

11. A process as defined in claim 6 wherein the aromatic diester is derived from terephthalic acid and the condensing agent is $Ca(HZr(OCH_3)_6)_2$.

12. A process as defined in claim 1 wherein the aromatic dicarboxylic acid diester is formed by a preliminary step comprising condensing an aromatic dicarboxylic acid having the formula:

$$HOOC-R_2-X-R_3-COOH$$

wherein $R_2$, $R_3$, and X are defined under (A), with an alpha, omega-dioxy compound which is defined under (B) and is employed in the proportions set forth under (B), at an elevated temperature, after which preliminary step the catalytic condensing agent which is defined under (C) is added and the condensation is completed as defined under (D), (E) and (F).

13. A process as defined in claim 12 wherein the elevated temperature employed during the preliminary step is substantially that at which reflux conditions subsist, and the condensing agent is employed in an amount of from about 0.005% to about 0.2% based on the weight of the aromatic dicarboxylic acid diester, the alpha, omega-dioxy compound is employed in such a proportion that there are from about 1.2 to about 3 alpha and omega oxy substituents in proportion to the acid substituents in the overall combination of the aromatic diester and the alpha, omega-dioxy compound, the elevated temperature employed during the earlier part of the condensation to form the polyester is from about 150° C. to about 220° C., the low pressure defined under (F) is less than about 15 mm of Hg pressure and all materials employed in the process are substantially anhydrous.

References Cited in the file of this patent

Meerwein: Ann. 455, 227, 1927.
Meerwein: Ann., 476, 113, 1929.